United States Patent [19]

Baehr et al.

[11] Patent Number: 5,884,025
[45] Date of Patent: Mar. 16, 1999

[54] SYSTEM FOR PACKET FILTERING OF DATA PACKET AT A COMPUTER NETWORK INTERFACE

[75] Inventors: Geoffrey G. Baehr, Palo Alto, Calif.; William Danielson, Mountain View, Calif.; Thomas L. Lyon, Palo Alto, Calif.; Geoffrey Mulligan, Colorado Springs, Colo.; Martin Patterson, Grenoble, France; Glenn C. Scott, Mountain View, Calif.; Carolyn Turbyfill, Los Gatos, Calif.

[73] Assignee: Sun Microsystems, Inc., Palo Alto, Calif.

[21] Appl. No.: 795,373

[22] Filed: Feb. 4, 1997

Related U.S. Application Data

[62] Division of Ser. No. 444,351, May 18, 1995, Pat. No. 5,802,320.

[51] Int. Cl.$^6$ .............................. H04L 9/00; G06F 13/00; G06F 15/163
[52] U.S. Cl. ................. 395/187.01; 395/200.79; 380/49; 370/355; 370/401; 340/827
[58] Field of Search .............................. 395/187.01, 186, 395/188.01, 200.3, 200.43, 200.57, 200.58, 200.59, 200.62, 200.68, 200.75, 200.79; 370/355, 356, 401, 402, 409; 340/827; 380/4, 23, 25, 49

[56] References Cited

U.S. PATENT DOCUMENTS

| | | | |
|---|---|---|---|
| 4,557,313 | 12/1985 | Sy ............................................. | 370/88 |
| 5,550,984 | 8/1996 | Gelb .................................... | 395/200.75 |
| 5,559,883 | 9/1996 | Williams ..................................... | 380/4 |
| 5,590,285 | 12/1996 | Krause et al. ...................... | 395/200.48 |
| 5,606,668 | 2/1997 | Shwed ................................ | 395/187.01 |
| 5,623,601 | 4/1997 | Vu ....................................... | 395/187.01 |

OTHER PUBLICATIONS

"Firewalls and Internet Security, " by Cheswick & Bellovin, Addison Wesley, 1994.
"Firewall Routers and Packet Filtering, " by Gary Kessler, February 1995.
ip–masq.c from Linux kernel (v.2.0.27), 1994.
ip–fw.c from Linux kernel (v 2.0.27), 1994.

Primary Examiner—Dieu-Minh Le
Attorney, Agent, or Firm—Finnegan, Henderson, Farabow, Garrett & Dunner, L.L.P.

[57] ABSTRACT

A system for screening data packets transmitted between a network to be protected, such as a private network, and another network, such as a public network. The system includes a dedicated computer with multiple (specifically, three) types of network ports: one connected to each of the private and public networks, and one connected to a proxy network that contains a predetermined number of the hosts and services, some of which may mirror a subset of those found on the private network. The proxy network is isolated from the private network, so it cannot be used as a jumping off point for intruders. Packets received at the screen (either into or out of a host in the private network) are filtered based upon their contents, state information and other criteria, including their source and destination, and actions are taken by the screen depending upon the determination of the filtering phase. The packets may be allowed through, with or without alteration of their data, IP (internet protocol) address, etc., or they may be dropped, with or without an error message generated to the sender of the packet. Packets may be sent with or without alteration to a host on the proxy network that performs some or all of the functions of the intended destination host as specified by a given packet. The passing through of packets without the addition of any network address pertaining to the screening system allows the screening system to function without being identifiable by such an address, and therefore it is more difficult to target as an IP entity, e.g. by intruders.

3 Claims, 7 Drawing Sheets

SYSTEM FOR PACKET FILTERING OF DATA PACKET AT A COMPUTER NETWORK INTERFACE

This application is a divisional application of U.S. patent application Ser. No. 08/444,351, filed May 18, 1995, now U.S. Pat. No. 5,802,320.

BACKGROUND OF THE INVENTION

The present invention relates to screening of data packets sent from one computer network to another. There are numerous ways for a user on a public network to interact with a host machine on a private network, such as in a telnet session, an ftp (file transfer protocol) session, by email (electronic mail), and so on. In addition, computers on a given target network may be requested to carry out certain operations by users outside the network, besides directly connecting the requester's machine.

Figure 1:
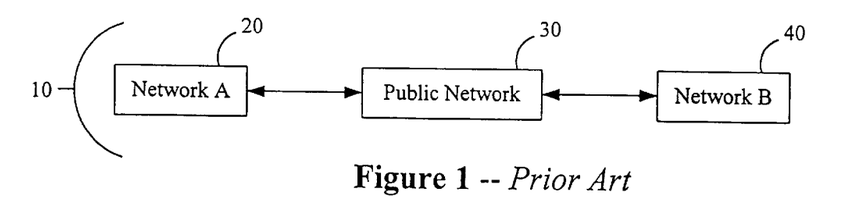
FIG. 1 is a block diagram of a system connecting two computer networks via a public network.

A conventional internetwork 10 is shown in FIG. 1, including a private network 20, a public network 30, and another private network 40. If the private networks 20 and 40 are not provided with firewalls, they are quite vulnerable to intruders.

Figure 3:
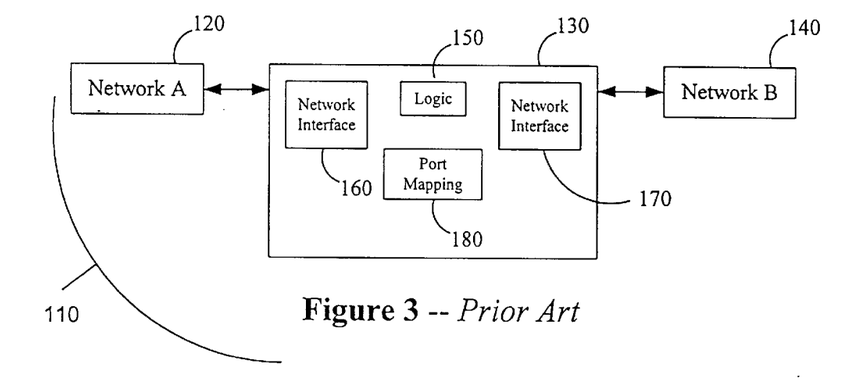
FIG. 3 shows a conventional system including a bridge between two computer networks.

FIG. 3 shows an internetwork 110 where a private network 120 can communicate with another private network 140 via a router or bridge 120, which is controlled by logic (such as a circuit, or typically a processor with associated memory) 150 which controls network interfaces 160 and 170. When a data packet arrives from network 140 addressed to a host and specifying a port on network 120, it is mapped to that host and port by unit 180, and transmitted via interface 160 to the appropriate destination on the network 120. FIG. 3 is also not provided with any security, and hence is available for targeting.

Figure 2:
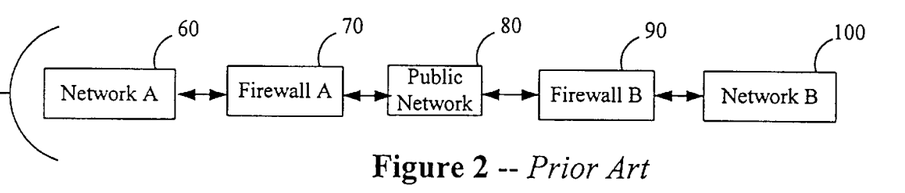
FIG. 2 is a block diagram of a system connecting two computer networks via a public network, using intervening firewalls.

Computer firewalls have therefore been developed, as in the system 50 shown in FIG. 2, where private networks 60 and 100 can communicate with one another via public network 80, but are provided with firewalls 70 and 90, respectively. A problem with conventional computer firewalls (and routers or bridges such as bridge 130 in FIG. 3) in use today is that they participate in IP (Internet Protocol) transactions, and in doing so generate information identifying them as IP machines, which makes them visible for targeting by intruders. For a detailed discussion of this and other types of problems with firewalls, see, e.g. the reference *Firewalls and Internet Security* by Cheswick & Bellovin (Addison Wesley 1994), and *Internet Firewalls and Network Security* by Siyan & Hare (New Riders Publishing 1995), which are incorporated herein by reference.

A firewall and packet filtering system should ideally be invisible to intruders so as to help minimize the number of ways in which it can be targeted, while nonetheless filling functions that are appropriate.

Current network security solutions often involve modifications to the networks in addition to the provision of firewalls, which can be complicated and expensive. A system is needed that can be connected to a network substantially without altering it, but providing security against breaches from outside the protected network.

Packet filtering systems are used today to provide security for networks, but conventionally acts as routers, having one port or network interface coupled to the protected network and another port to another network or the Internet. As routers, such systems are responsive to IP commands, and in particular may respond to data packets by using their IP address. This allows intruders to target them for characterization and attack.

The same type of targeting may be accomplished when addresses within a protected network are known to users outside the network. It would therefore by advantageous to provide a system that can respond to data packets from outside a network without revealing IP address information about either the filtering system or about hosts within the network.

SUMMARY OF THE INVENTION

The present invention is directed to a screening system that acts as both a firewall in the conventional sense and a signatureless packet filtering system. A screen is positioned on the network connection between, for example, a public network and a private network that is to be protected from targeting for attack. A port or network interface is provided for each of the two networks, and one or more additional ports are provided to one or more proxy networks.

The screening system includes a packet filtering subsystem or module, which inspects each incoming packet and sends it to an engine, which determines, based upon the packet inspector and other information, what actions should be taken on the packet. The packet is passed to an actions subsystem or module, which executes the appropriate actions.

If the packet's intended destination is a host machine on the private networks, it may instead be sent aside to a preconfigured host machine on the proxy network, which executes appropriate operations that the actual host would execute, or different operations as desired. The proxy host generates responses using the IP address of the actual host, so the existence of the proxy network is not detectable. The screening system is not a router and hence does not have its own IP address, so it too cannot be detected in this manner, and is not subject to such operations as trace_route, ping, finger, and so on.

The screening system requires no modification to the private or public networks; instead, it can be connected in-line on the network connection, a proxy network can be set up with as many hosts as desired, and security is thereby provided without reconfiguring the private network or altering the network software.

The screening system can be preconfigured to carry out a wide range of other actions on the packets, all subject to predetermined criteria, such as dropping them with or without an error message, logging them, altering them or their headers, and so on. Each of these and other actions can be carried out while maintaining the anonymity of the screening system.

DESCRIPTION OF THE PREFERRED EMBODIMENTS

The Hardware of the Invention

Figure 4:
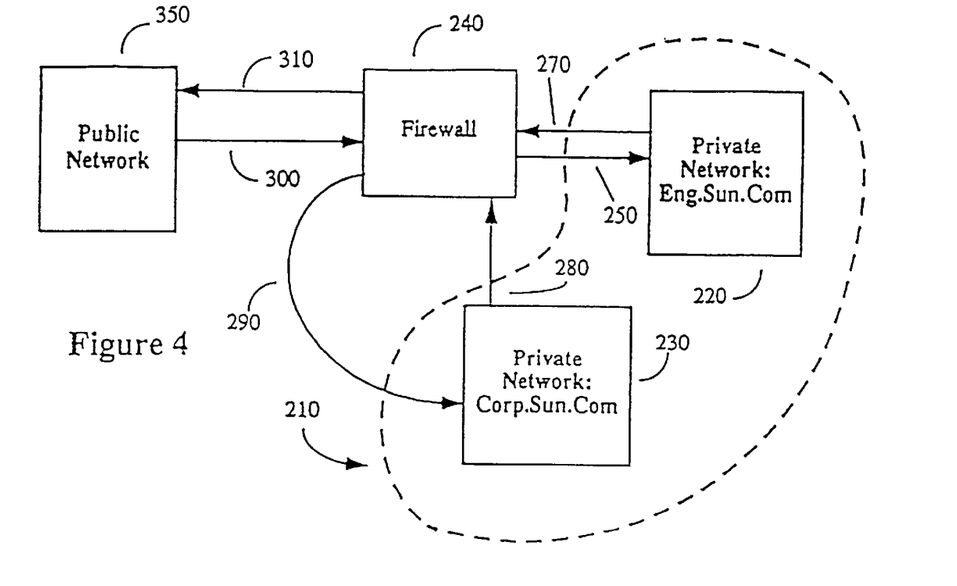
FIG. 4 is a block diagram of an exemplary connection from a private network and a public network to another private network, via firewalls.

FIG. 4 shows an internetwork system appropriate for implementation of the present invention. A public network 200 (or network of networks, such as the Internet) can communicate with a private network or internetwork 210, which includes by way of example an engineering domain network 220 and a corporate domain network 230. A conventional firewall 240 is positioned as shown between the network 220 and the networks 230 and 200. Note that the firewall may, as illustrated, be positioned between a given private network (220) and a public network (200), and also between the private network 200 and other networks (such as 210) which on its own private internetwork. The networking hardware and software can be any suitable conventional networking system, such as Ethernet.

Firewall 240 may be configured as a single machine or as separate machines, one handling the incoming data packets and the other handling the outgoing data packets from network 220, as desired by the implementer. In addition, another firewall specifically for the corporate domain network 230 would normally be used, but is not illustrated in this figure.

Any data packets transmitted from either of the networks 200 or 230 travel via connections 300 or 280 to the firewall 240, which may be conventional except in the respects noted below. Firewall 240 passes allowed data packets via connection 250 to the network 220.

Likewise, data packets from network 220 addressed to destinations within network 200 or network 230 are transmitted over connection 270 to the firewall 240, which passes packets as requested, subject to its security provisions, via connection 310 (if to network 200) or connection 290 (if to network 230). Connections 250 and 270–310 may all be conventional network connections, for example cables, fiber optics, or the like.

Figure 5:
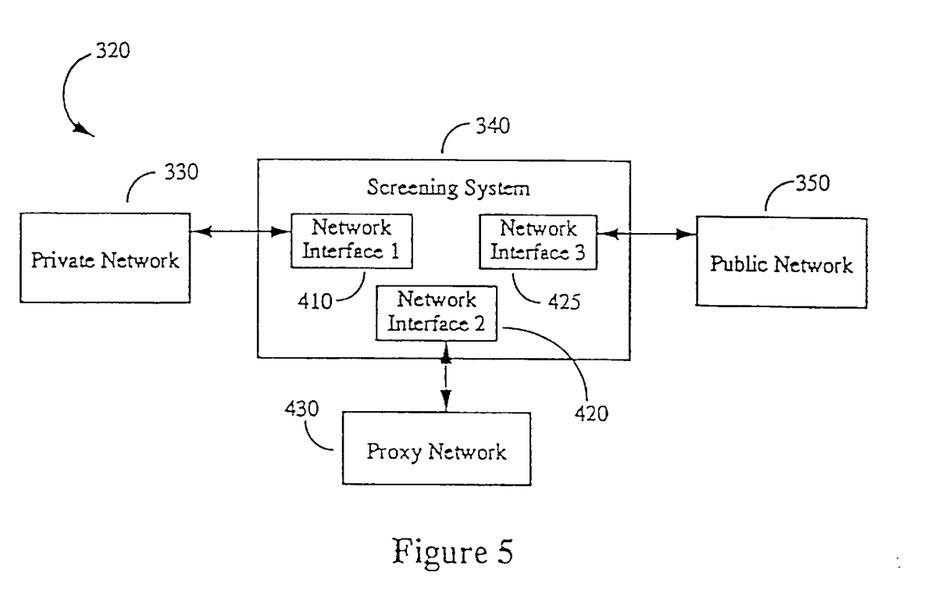
FIG. 5 is a block diagram of computer internetwork including a packet screening system according to the invention.

FIG. 5 is a logical block diagram of a packet screening system 340 of the invention that can be implemented in an internetwork system 320—which may alternatively be an internetwork such as that shown in FIG. 4; thus, firewall 240 may be replaced by the screening system 340, which is configured to handle all of the conventional firewall functions plus the screening functions described below.

In FIG. 5, a single private network 330 is shown coupled via a standard network interface 410 to the packet screening system (or simply "screen") 340. In addition, public network 350 is coupled to the screen 340 via another standard network interface 425. A third network, proxy network 430, is coupled to the screen 340 via network interface 420.

Using firewall connections such as those in FIGS. 4 and 5, any number N of private networks (which in this case may be considered to include the proxy network) may be coupled via multiple screens 340 of the invention to one another and to any desired number M of public networks. Thus, an N×M screening system may be formed; in the example of FIG. 5, N=2 and M=1. See also the discussion below of FIG. 8.

It is equally possible to build a system of the invention without the proxy network, where N=M=1, and where data packets would be passed through without alteration of the IP address in one or both directions, or with some alteration but without adding any IP or other network address of the screening system itself. Such a system is described below in connection with FIG. 8A.

Figure 6:
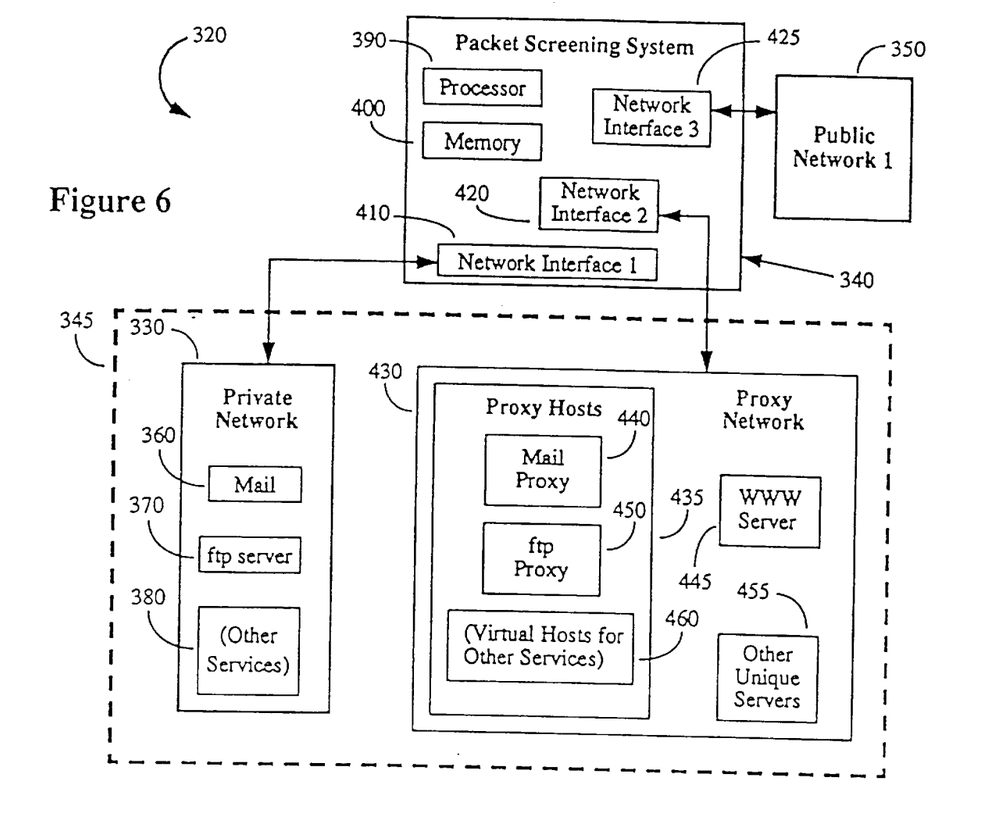
FIG. 6 is a functional block diagram of a packet screening system of the invention on an internetwork.

FIG. 6 shows greater detail of the screen 340, which may be a uni- or multiprocessor based system; in this embodiment, a single processor 390 is shown, coupled to one or more conventional memories (for example, RAM, ROM, EPROM, disk storage, etc.) 400, which store(s) the instructions necessary to execute the operations carried out by the invention. The network interfaces 410–425 are controlled by the processor 390 in conventional fashion.

The private network will typically include many different hosts: examples are a mail host 360; an ftp (file transfer protocol) host 370 for governing ftp connections; and other hosts 380 for other services, such as a WWW (World-Wide Web) server, hosts for rlogin (remote login) and rshell, and so on.

The proxy network 430 includes proxy (or virtual) hosts 435, which preferably are separate computer systems. In the preferred embodiment, the proxy network 430 includes a virtual host mirroring (or acting as proxy for) each of a subset (or all) of the hosts found on the private network 330, in a manner to be described below.

Such virtual hosts in the embodiment shown include a proxy mail server 440, a proxy ftp server 450, and other virtual hosts 460, with a virtual (proxy) host for each actual host desired to be duplicated—which may include some or all of the actual hosts. The proxy hosts are "virtual" in the sense that they are not the actual targeted hosts 360–380, but rather mimic the behavior of the those hosts; but they do represent actual hardware and/or software in the proxy network.

Hosts may also be included that are unique to the proxy network. For instance, the proxy network 430 may include a WWW server 445 which is unique to the proxy server, i.e. is not merely a mirror or proxy for a WWW server within the network 330. In this case, when a user from network 350 requests a connection to http://www.<private. network>. com, he/she will be connected to WWW server 445. Other servers 455 unique to the proxy network 430 may also be provided.

A proxy network may thus include proxy hosts representing actual hosts, and/or proxy hosts with unique servers, in any combination (zero to several of each). Whichever configuration is adopted, the private network 330 and the proxy network 430 together form a single logical or apparent network 345, i.e. a single apparent domain from the point of view of outsiders, such as users on the public network 350, so that when a user attempts to access a service or host of the private network, the request may be shunted aside to the proxy network to either a mirroring proxy host or a unique proxy host, without any indication being given to the user that this has occurred. (Note that "proxy host" may mean that it is a proxy for an actual host, or may mean that it is a host on the proxy network, albeit a unique host.)

Figure 7:
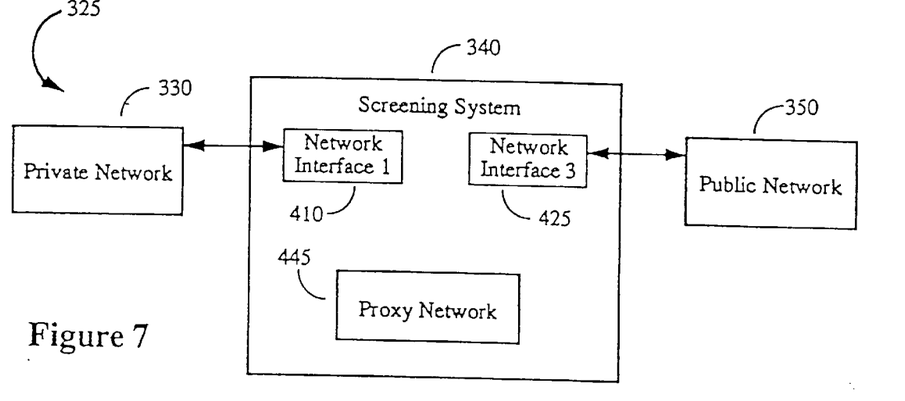
FIG. 7 is a block diagram of an alternative embodiment of the packet screening system of the invention.

FIG. 7 shows an alternate embodiment of the system of the invention, namely a system 325 wherein the proxy network 430 is implemented entirely in program instructions stored in the memory 400 of the screen 340, or as additional processor(s) and memory(-ies) controlled by program instructions stored in one or more of the memories. In this case, the screen 340 and proxy network 430 shown in FIG. 6 constitute separate logical entities, but not separate physical entities (except to the extent that the instructions, data, commands, signals, etc. are themselves separate physical entities). That is, the screen 340 and proxy network may be a single unit. In this embodiment, the proxy hosts 360–380 are emulated by the program instructions, so that all of the behavior of any of the actual hosts may be mimicked by a virtual proxy host module. The remainder of the present disclosure is with reference to FIGS. 5–6, but should be understood as applicable as well to the embodiment of FIG. 7.

Figure 8:
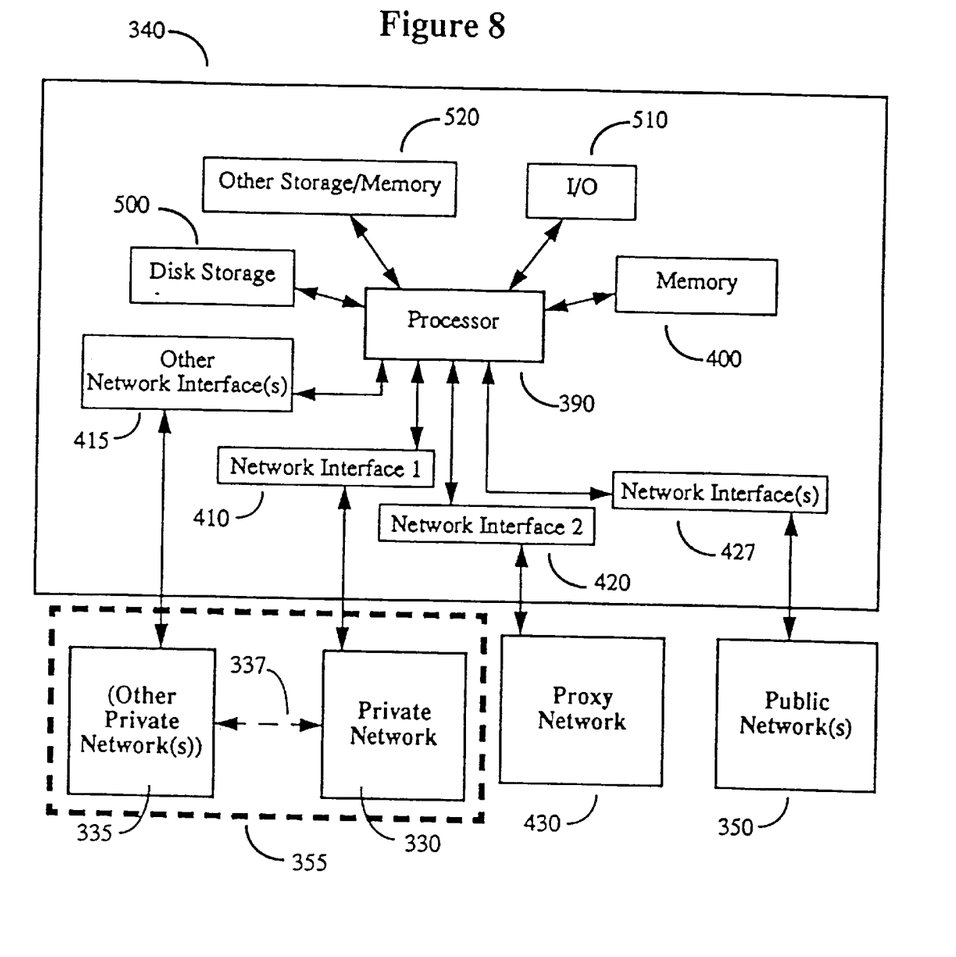
FIG. 8 is a block diagram of hardware for implementing the invention.

FIG. 8 is a block diagram of the hardware for implementing the system of the invention, showing additional detail of the screen 340 over that shown in FIGS. 5–6. Like-numbered elements in the drawings are alike; so it will be seen that FIG. 8 additionally shows conventional disk storage 500, and I/O (input/output) devices 510 such as a smart card, keyboard, mouse, monitor, and/or other standard I/O devices are provided, as well as other desired conventional storage or memory 520. The instructions or program modules stored in memory 400 control the operation of the screen 340.

In one embodiment, the screen does not provide conventional user-level access, e.g. does not include the standard keyboard and monitor. This is a security feature to prevent meddling with the screen's configuration. In such an embodiment the screen is administered remotely through a dedicated network port with a secret IP (or other protocol) address that responds only to communications that are authenticated, encrypted and conforming to a dedicated, special-purpose administration protocol. Such a protocol, and the encryption and authentication schemes used, may be developed and/or selected by the screen administrator.

As shown in FIG. 8, the screen 340 may include, instead of a single port 425 (as in FIG. 5) connected to a public network, multiple ports 427 may be provided and are connected to multiple public networks, respectively, and may include one or more additional ports 415 connected to other private network(s) 335. For instance, a private network 335 may be an engineering domain eng.sun.com in a company, while the private network 335 may be a corporate domain corp.sun.com within the same company. The eng.sun.com and corp.sun.com domains may communicate with one another (if desired, through an additional screen of the invention or a conventional firewall, not shown) via connection 337, and form a single private internetwork 355, while both these domains are protected against intrusions from public network (s) 350 by the screening system 340. The proxy network 430 in this embodiment includes proxies for both the eng.sun.com and corp.sun.com domains.

Thus, although in the remainder of the present discussion it is assumed that the communications in question are between a single public network 350 and a single private network 330, the features of the invention may equally well be applied to multiple private networks 330, 335 connected via the screen 340 to multiple public networks 350.

Figure 8A:
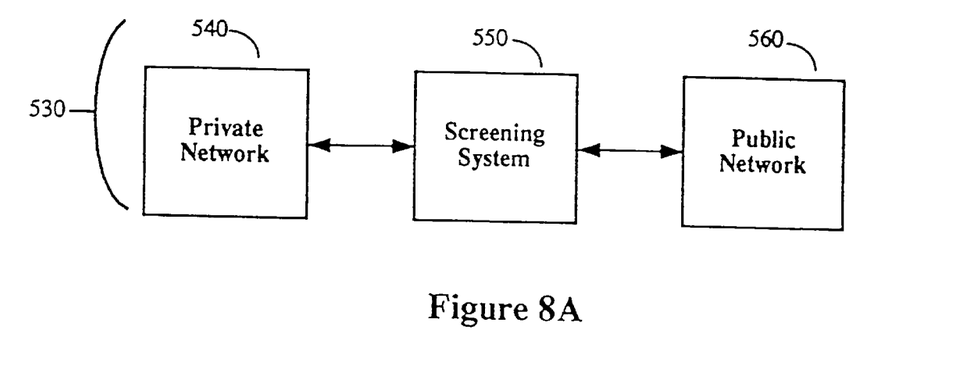
FIG. 8A is a diagram of another embodiment of the invention.

In the system 530 shown in FIG. 8A, a private network 540 is provided with a screening system 540 according to the invention, but without the proxy network. In this and the other embodiments, data packets are transmitted in either direction without alteration of their IP addresses, or alternatively with some alteration but without adding any IP or other network address of the screening system itself. The decision to alter addresses or not call be made on a packet-by-packet basis according to the predetermined criteria.

In the system of the invention (including any of the embodiments of 5–9), the source and destination addresses that are provided with the packet would thus remain (whether altered or not) the sole host identifiers or addresses associated with the packet. In an alternative to this embodiment, the screening system can substitute another network address for either the source address or the destination address (or both), where the newly substituted address is either bogus or belongs to a host other than the screening system. In either case, no network address pertaining to the screening system attaches to a data packet.

As indicated above, the screening system preferably does not even have an IP or other network address, and while it can interpret IP protocol, it is configured not to respond to IP requests. Thus, the screening system avoids detection and hence targeting by intruders.

The operation of the system of FIG. 5–6 will be discussed in detail below in connection with FIGS. 9–11, but should be understood as to apply to the other embodiments of the invention. Each of the operations, actions or functions to be executed by the system of the invention, as discussed above and hereinafter, may be implemented as program instructions or modules, hardware (e.g. ASICs or other circuitry, ROMs, etc.), or some combination thereof.

General Handling of Data Packets

In FIG. 6, when a data packet arrives from the public network 350 addressed to one of the hosts or servers 360–380, it is intercepted by the screen 340. Such a packet typically will include a source address, a destination address, a requested operation and/or service, and other information, such as a message (if it's email), data to be operated on, and so on.

The screen 340 includes instructions stored in memory 400 governing its control of actions to be taken on the incoming (and outgoing) data packets. These instructions include a predetermined set of criteria based upon the aforementioned contents of the data packets (source and destination addresses, type of service, or other information obtainable from the data packets), and based upon other information, such as: the time of day the packet was sent or is received by the screen; the state of the connection between the public and private networks (or the state of the connection to a particular host or service in the private network); and more obliquely obtainable information, such as whether the source address emanates from an expected (inter) network location. This may be done by determining whether the source host is in the expected domain, or it may be done by determining whether the packet arrives at a network interface expected for that packet. For instance, a packet whose source address is identified as a host on private network 330 should not arrive at network interface 425 (in FIG. 6) for the public network 350; if it does, this is an indication that an intruder may be attempting to breach the private network by masquerading as a trusted host. In this case, the screen 340 should drop the packet without reply.

Such screening criteria can be implemented by inspecting the contents of the data packets, by reference to external data (such as connection status and time of day), and by reference to pre-defined tables or other information useful to implement the criteria and stored in the memory 400. For instance, a table may be provided of all source addresses allowed to communicate with the network 330 correlated with the types of operations and services they are allowed to use, the times of day they are allowed to be connected or to pass packets, the expected locations for the sources (since a connection from an unexpected source may indicate a security problem), the number of times a source is allowed to commence a transaction, the total amount of time (e.g. per day or month) that a particular source is allowed to use services of the network 330, and so on.

The application of the screening criteria lead the screen 340 to take one or several pre-defined actions or each data packet; these actions are discussed below.

Actions To Be Taken on Packets

Actions are taken on each data packet by the screening system 340, based upon the fore-going criteria and the particular security protocol and level for that packet as determined in advance by the system administrator. For instance, it may be decided that no packets from (or to) any source that is not cleared in advance will be allowed in; in this case, packets from (or to) any other source will be dropped by the screen 340 without further action, either with or without an error message or other communication back to the sender; the sender will have no indication of what has happened to the packet, and there will be no "bounce" message.

This helps prevent attacks on the system. For instance, if a trace_route packet is received, instead of following the normal IP procedure of responding to the packet the screen of the invention simply discards it, and the initiator of the trace_route command cannot in this way detect the screen.

Topology hiding, i.e. changing the network address of the packet as it passes through the screen, can be done so that it appears that all the packets issuing from the screen come from the same host, even though they are coming from a multiplicity of sources. This inhibits outsiders attempting to leverage off the knowledge they may gain by leaning userid's, host names, etc. within the private network.

Another action can, of course, be to simply pass the packet through to its destination, with or without some alteration based upon predetermined criteria. For instance, it may be decided in advance that all packets from a given host inside private network 330 will have the userid or host ID stripped off, and the packet may be passed through with some other IP source address.

Encryption and decryption may also automatically be executed on certain data packets, with the criteria defined by the system administrator. Along with this it may be desirable to encapsulate a packet and give it a new header with a new IP address, as described for instance in applicant's copending U.S. patent application entitled "System for Signatureless Transmission and Reception of Data Packets Between Computer Networks" by Aziz et al., Ser. No. 08/306,337 filed Sep. 15, 1994, now U.S. Pat. No. 5,548,646, which is incorporated herein by reference.

Packets will normally be logged in the log file storage 640 (especially failed attempts or requests), including whatever information the system administrator decides is important, such as: time of day; source and destination addresses; requested operation(s); other actions taken with respect to each packet; number of requests to date from this source; and so on.

Packets may also be counted, so a running total of the number processed in a certain time period is kept.

Address rewriting is mentioned above; other contents of the packet may also be automatically be rewritten by pre-defined actions, including rewriting or otherwise altering data or messages carried by packets.

State information about the packets can also be determined, logged if desired, and altered by actions. For instance, TCP/IP (transmission control protocol/internet protocol) status can be affected as desired to establish, maintain or end a connection. In general, the screen can store information about what state each packet is in, and take actions dependent upon that state, including maintaining information about which packet was the initial request, which is the response, and so on; so prior events may have to be stored for some time, but in this case the screen can determine the entire history of a series of transactions and take appropriate actions at each time.

An important action for security purposes is that of sending packets aside to the proxy network 430, which includes servers/hosts as discussed above that execute operations upon the packets as if the proxy hosts were the actual, intended destination servers. Upon execution of such operations, a proxy host may then return a given packet to the sender, i.e. send the packet off with the original sender's address as the destination. That packet will then go through the screen 340, which will subject it to the predetermined inspection criteria, just as when it was first received at the screen from, for instance, public network 350. The criteria will typically have different results for packets emanating from the proxy network 430 or the private network 330; for instance, it may be decided that no hosts outside the public network may institute telnet sessions to the private network, but that hosts inside the private network may institute telnet sessions to hosts outside the private network.

The fact that the screening system has no network address (IP or otherwise) enables it to carry out its security functions anonymously; notably, it does not act as a conventional network bridge. If the screen 340 provided the functions of a bridge, it would have to respond to IP commands, and hence would be detectable and targetable.

The proxy network has the additional advantage of preventing outsiders from ever actually entering the private network 330; once a user has been allowed access or a connection to a private network, it is much more difficult to restrict his/her actions than if no access at all is allowed. By provided duplicate or mirrored proxy functionality of some of the services of the private network in the proxy network, and/or functionality of unique host or other services (hardware ware and/or software) in the proxy network, the outside user's requests are met while invisibly preventing him/her from ever actually accessing the private network.

In addition, it may be decided that no such sessions may be instituted at all from within the proxy network, which might compromise security of the private network, since packets from the proxy network in general will otherwise have lower hurdles to overcome to be retransmitted by the screen, since they will be more "trusted" by the system. Allowing the proxy network to initiate TCP sessions might allow a intruder from outside the system to effectively bypass the firewall security if he/she can figure out how to cause the proxy network to institute a TCP session instead of having to do so from the public network.

It may be desirable to allow certain connections to be established from the private network to the public network, but not vice versa. For instance, TCP sessions (such as telnet or ftp) may be initiated by a user within the private network 330 to the public network 350, while blocked from any public network machine to the private network.

In general, all actions taken by the proxy network will pass the packets without identifying the proxy network or any host in it as a separate IP entity. Thus, the packets will, upon being passed or returned after processing, either appear actually to have been processed by the specified destination host (when in fact the proxy host has handled it), or they will be processed to remove, alter, or otherwise obscure the destination address (which is the source address for return packets). In either case, no IP address for the proxy host exists, and none is appended to any packets.

Functional Architecture of the Screening System

Figure 9:
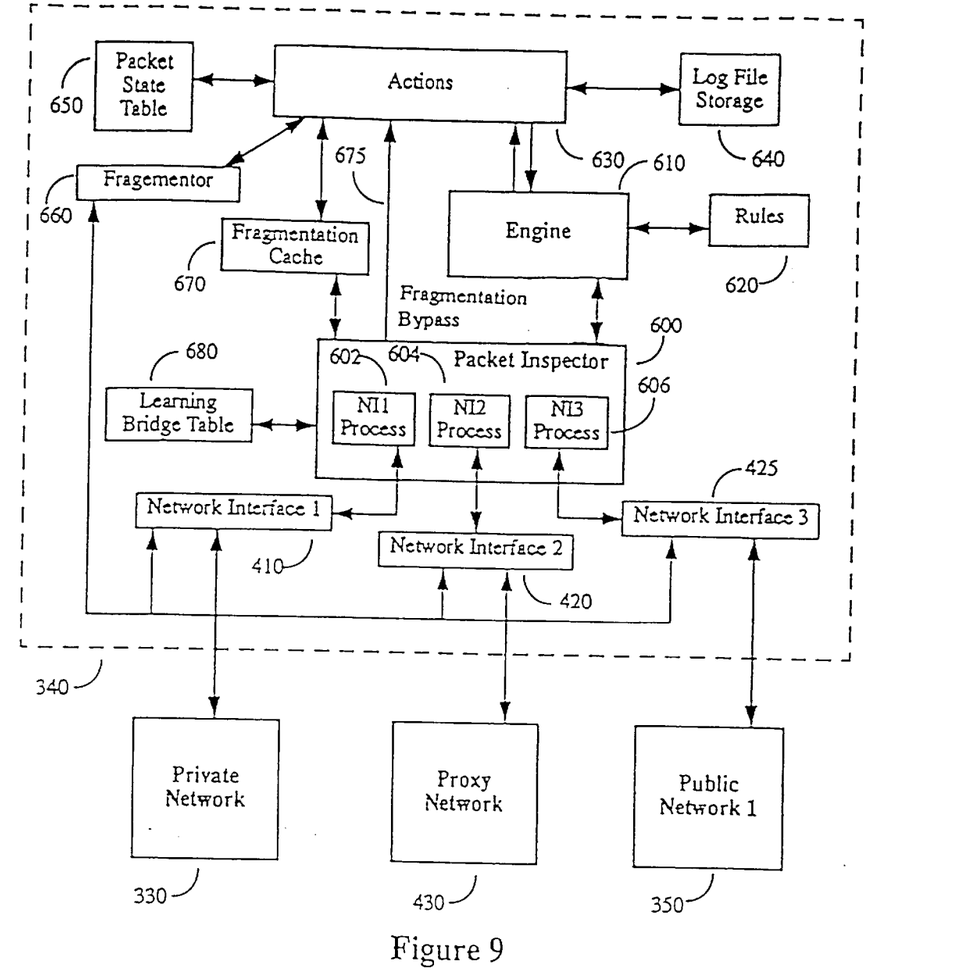
FIG. 9 is functional block diagram of the invention.

FIG. 9 is a functional block diagram corresponding to FIG. 8, but showing the functional modules that are used by the screen 340. In the preferred embodiment these modules are, as indicated above, program instruction modules stored in memory 400 and executed by processor 390.

The modules shown in FIG. 9 include a packet inspector 600 with a process 602–606 for each of the network interfaces 410–425; an engine 610 with rules 620; actions 630 and a log file storage 640; a packet state table 650, which is a conventional hash table; a cache fragmentation module 670 (along with a fragmentation bypass as shown); a packet fragmentor 660 coupled to each of the network interfaces 410–425; and a learning bridge table 680. The connections shown in FIG. 9 refer to logical (software) instructions or hardware instructions or both, depending upon the particular physical implementation of the invention.

The packet inspector 600 includes the instructions for inspecting the contents of the incoming packets based upon the criteria discussed above. That is, each incoming data packet, wherever it comes from, is subjected to packet inspection by the packet inspector 600.

The engine 610 processes incoming packets, and passes them to the actions 630 to execute the appropriate operations on the packets, as discussed above. The actions modules 630 are the modules dedicated to performing these operations.

The log file storage 640 is used to store information about the data packets received at the screen 340, as discussed above. The packet state table 650 is similarly used to store information about states of the received packets.

The fragmentor 660 operates in a conventional manner to fragment packets that are larger than a predefined maximum transmission unit (MTU). This may occur, for instance, where the screen adds information to a packet so as to increase its size past this allowable maximum. A fragmentation cache 670 is used in conventional fashion to implement fragmentation and reconstruction of packets. Fragmentation packets typically include primarily or only an IP header information and data (in particular, no port number is included), and the screen 340 will rebuild the packets as necessary, using the fragmentation cache. That is, the first fragmented packet is stored in the fragmentation cache, as are subsequent fragments, until the last fragmented packet is received, and the packet is then reconstructed.

The fragmentation bypass 675 is used by the packet inspector to bypass the engine operation for fragmented packets for which information is found in the fragmentation cache 670. Thus, when fragmented packets that second or later in the series of fragmented packets are received, this is detected when the packet inspector 600 checks the fragmentation cache 670. In such a case, the newly received fragmentation packet is sent via bypass 675 to the actions 630, rather than via the engine 610.

The learning bridge table 680 allows the screen 340 to act as a conventional learning bridge, i.e. to keep track of which hosts are on which side of the screen, and maintain tables of this information as packets arrive from one host or another at each of the screen's ports (network interfaces).

Operation of the Screening System

Figure 10:
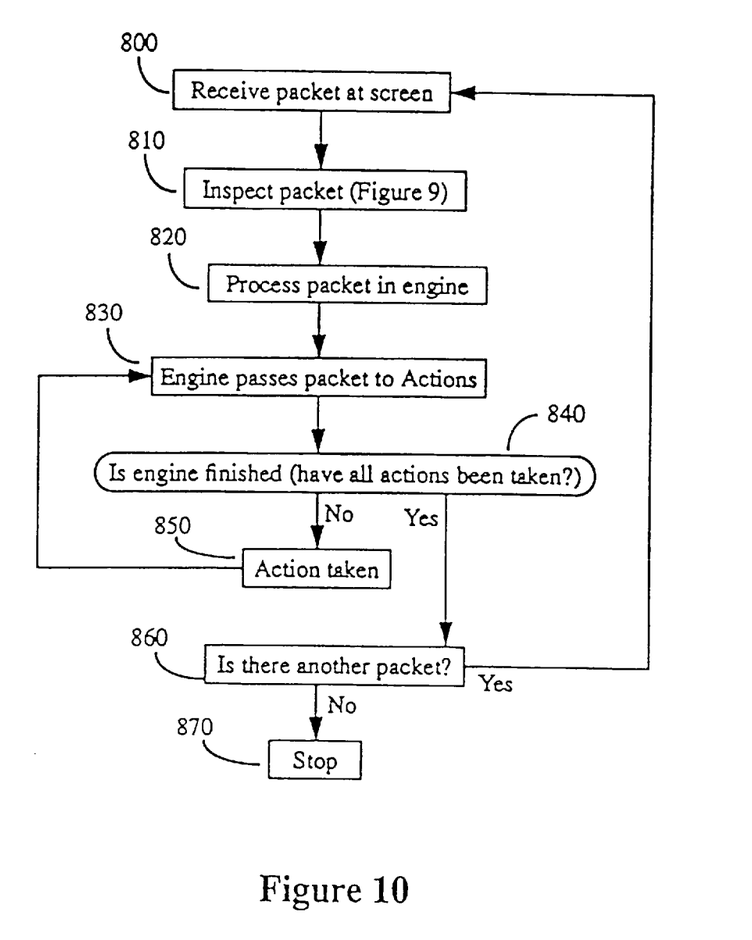
FIGS. 10–11 are flow charts of the method of packet screening according to a preferred embodiment of the invention.
Figure 11:
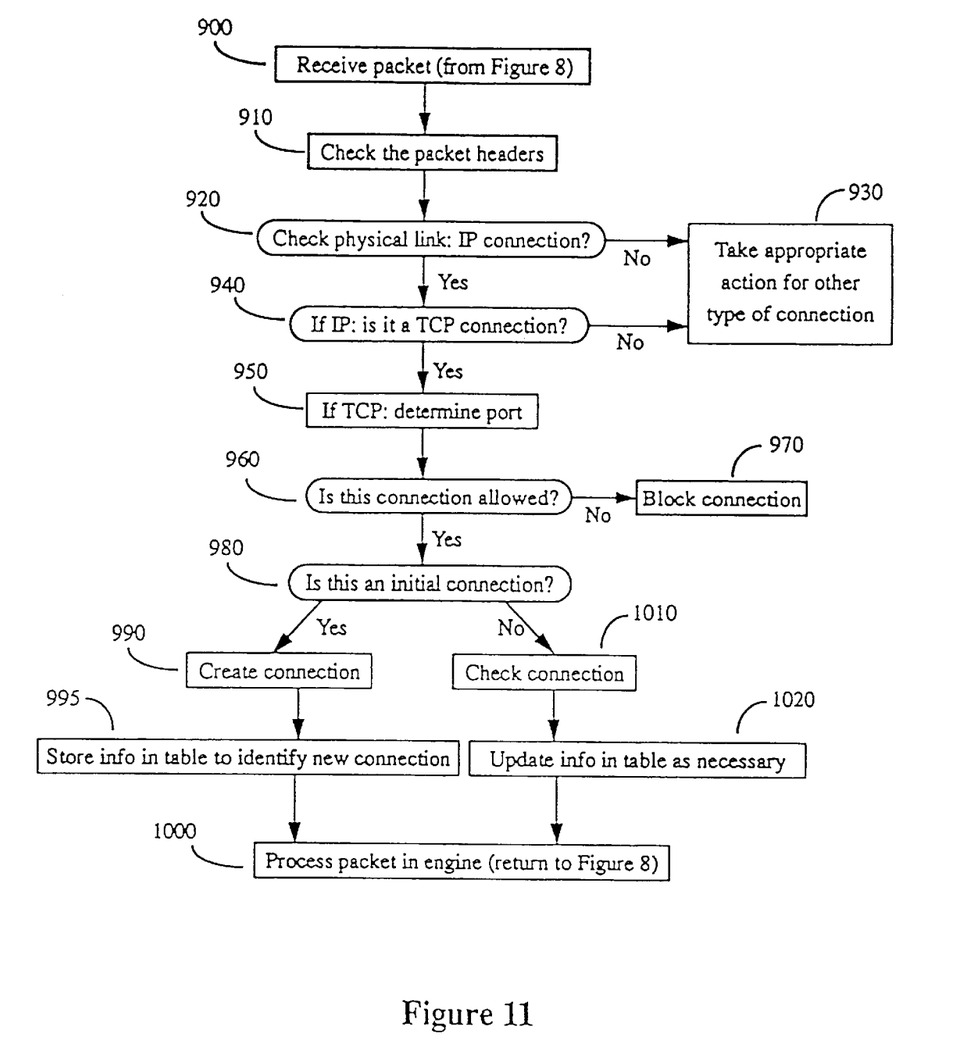

FIGS. 10–11 are flow charts showing a preferred embodiment of the method of the invention. When a packet is sent by a host on, for instance, public network 350, it is received at port (interface) 425 of the screen 340. See box 800 in FIG. 10. The packet inspector inspects the contents of the packet as described above (box 810).

If the packet is to be rejected, it is efficient to do this by using the learning bridge table (of source addresses) 680.

One embodiment suitable for implementing packet inspection is shown in the flow chart of FIG. 11, though many variations are possible. In this exemplary flow chart, upon receipt of the packet (box 900), each of the packet headers is inspected in order (box 910), i.e. the physical link (such as IP); the IP header (is it TCP?); the TCP header (as to which port is designated and whether it's an existing or a new connection); and so on.

At box 920 and 940, negative determinations lead to box 930 for appropriate actions; positive determinations lead to box 950, where the designated port is determined, and then to box 960, where it is determined whether this particular connection is allowed, taking into account the information that the packet inspector has at its disposal, including the header information and also the packet contents, source, destination and the other information mentioned above.

If the connection is not allowed, it is blocked (box 970), but otherwise it is allowed, and then the method tests whether it is an initial connection (box 980)—if so, then at box 990 the connection is established, and at box 995 information is stored in the state table 650 (see FIG. 9) to identify the new connection. If not, then the connection is checked at box 1010, and any update information (e.g. new information about the connection) is stored in table 650.

From either step 990 or 1020, the method proceeds to box 1000, i.e. returns to box 810 in FIG. 10.

It will be appreciated as mentioned that FIG. 11 is but one embodiment of myriad possible sequences of tests and operations that may be carried out in the packet inspection phase. The operations executed of FIG. 11 may be carried out by the engine 600 based upon the results of the packet inspection (e.g. at boxes 920, 940, 960 and 980).

Proceeding to box 820 in FIG. 10, the packet is passed to the engine 610, which executes the appropriate predefined operations discussed above. Typically, for firewall/screen 340 this will involve blocking or passing the packets, where if they are passed they may be turned aside to be operated upon by a proxy host in the proxy network 430.

The current packet is thus passed to the actions module 630 for execution of the appropriate actions (box 830), and at box 840 the engine determines whether there are additional actions to be taken, based upon the packet inspector results and its own determination of which actions were appropriate to take. On the first pass through for a given packet, there will be at least one action to take (even if it is only one action, e.g. to drop the packet without further action); so the first time through, box 840 will lead to box 850, where the first action is taken.

The method then proceeds back to box 830, and this loop is completed until all actions determined by the engine have been taken by the actions module. At this point, box 840 leads to box 860, where the screen 340 determines whether there is another packet at one of its input ports (network interfaces). If so, the method begins anew at box 800, and if not, then the method ends at box 870. It may recommence any time a new packet is received.

What is claimed is:

1. A screening system connected to a first computer network and a second computer network, said screening system for screening data packets transmitted between the first and second networks without revealing an IP address, including:

a processor;

a memory coupled to the processor;

interface circuits for transmitting and receiving data packets to and from said first and second networks; and program instructions stored in said memory for controlling flow of data packets between the first and second networks, including:

a first program module for determining whether a first data packet transmitted from the first network to the second network meets predetermined criteria;

a second program module for passing the first data packet to the second network if the predetermined criteria are met;

a third program module for preventing passage of the first data packet to the second network, if the predetermined criteria are not met.

2. The system of claim 1, where the third program module prevents passage of the first data packet without sending a response to the first network.

3. A proxy system coupled to a screening system connected between a first computer network and a second computer network for screening data packets sent from said first network to said second network without revealing an IP address, at least one said data packet including a first field specifying an intended recipient system for the data packet and further including a second field specifying a requested operation for said intended recipient system to execute, the proxy system including:

a processor;

a memory connected to said processor configured for storing instruction modules specifying operations to be executed by said processor;

a plurality of action modules stored in said memory including instructions specifying a predetermined set of actions to be taken with respect to at least a first said data packet received at said screening system, based upon predetermined criteria with respect to contents of said first data packet;

a screening module including instructions for the screening system to block passage of said first data packet to said second computer network; and an operation module controlling said plurality of action modules to select one of said actions to be taken by said proxy system processor in lieu of said requested operation.

* * * * *